US012534935B2

(12) United States Patent
Huynh

(10) Patent No.: US 12,534,935 B2
(45) Date of Patent: Jan. 27, 2026

(54) PICK RESISTANT PIN TUMBLER LOCK

(71) Applicant: Thao Trong Huynh, Campbell, CA (US)

(72) Inventor: Thao Trong Huynh, Campbell, CA (US)

( * ) Notice: Subject to any disclaimer, the term of this patent is extended or adjusted under 35 U.S.C. 154(b) by 46 days.

(21) Appl. No.: 18/753,565

(22) Filed: Jun. 25, 2024

(65) Prior Publication Data

US 2025/0101770 A1 Mar. 27, 2025

Related U.S. Application Data

(60) Provisional application No. 63/584,232, filed on Sep. 21, 2023.

(51) Int. Cl.

| | |
|---|---|
| ***E05B 47/00*** | (2006.01) |
| ***E05B 15/00*** | (2006.01) |
| ***E05B 15/14*** | (2006.01) |
| ***E05B 27/00*** | (2006.01) |

(52) U.S. Cl.

CPC ...... *E05B 47/0044* (2013.01); *E05B 15/0073* (2013.01); *E05B 15/14* (2013.01); *E05B 27/0017* (2013.01); *E05B 27/0057* (2013.01)

(58) Field of Classification Search

CPC .. E05B 15/0073; E05B 15/14; E05B 27/0014; E05B 27/0017; E05B 27/0057; E05B 27/083; E05B 47/00; E05B 47/0044

See application file for complete search history.

(56) References Cited

U.S. PATENT DOCUMENTS 1,172,203 A * 2/1916 Fuller ................. E05B 47/0044 70/276
2,111,098 A 3/1938 Samuel
2,596,720 A 5/1952 Ferro
2,836,973 A 6/1958 Schillizzi
3,045,468 A 7/1962 Roberts
3,298,211 A 1/1967 Russell
3,665,740 A * 5/1972 Taniyama ........... E05B 47/0044 70/276
3,762,193 A 10/1973 Hucknall
3,783,660 A 1/1974 Gill
3,837,194 A * 9/1974 Fish .................... E05B 47/0044 70/276
3,987,654 A 10/1976 Iaccino et al.

(Continued)

FOREIGN PATENT DOCUMENTS

CN 110130730 A * 8/2019 ............. E05B 19/14
EP 2886754 A2 * 6/2015 ......... E05B 47/0044

(Continued)

*Primary Examiner* — Christopher J Boswell

(74) *Attorney, Agent, or Firm* — Mark Terry

(57) ABSTRACT

A pin tumbler lock apparatus includes a shell and a gate housed within the shell. The gate consists of a cylindrical case with multiple bores. A core, positioned within the gate, features a keyway and additional bores aligning with the gate's bores to form pin chambers when locked. Key pins within these chambers are magnetically responsive and vary in height within a defined range. Each key pin comprises a body and an oversized top element. Channels in the gate correspond to the pin chambers, allowing the top element of each key pin to move within its respective channel when a key is inserted into the keyway and the core is rotated relative to the gate.

20 Claims, 14 Drawing Sheets

(56) References Cited

U.S. PATENT DOCUMENTS

| | | | | |
|---|---|---|---|---|
| 4,068,509 | A | 1/1978 | Genakis | |
| 4,078,406 | A | 3/1978 | Genakis | |
| 4,235,086 | A | 11/1980 | Genakis | |
| 4,380,162 | A * | 4/1983 | Woolfson | E05B 47/0044 70/276 |
| 4,655,063 | A | 4/1987 | Foshee et al. | |
| 4,802,354 | A | 2/1989 | Johnson | |
| 5,018,376 | A | 5/1991 | Lee | |
| 5,934,119 | A * | 8/1999 | Keller | E05B 27/0021 70/276 |
| 5,964,111 | A | 10/1999 | Lambert | |
| 7,086,259 | B2 | 8/2006 | Almoznino | |
| 8,096,155 | B2 | 1/2012 | Williams | |
| 8,739,588 | B2 | 6/2014 | Burmesch et al. | |
| 10,844,630 | B2 | 11/2020 | Trupiano | |
| 2006/0048554 | A1 * | 3/2006 | Keller | E05B 47/0044 70/417 |
| 2009/0173121 | A1 * | 7/2009 | Cheng | E05B 47/0044 70/493 |
| 2023/0065524 | A1 | 3/2023 | Robert | |

FOREIGN PATENT DOCUMENTS

| | | | | |
|---|---|---|---|---|
| GB | 2506580 | A | 4/2014 | |
| WO | WO-2008074642 | A1 * | 6/2008 | E05B 27/0057 |

* cited by examiner

PICK RESISTANT PIN TUMBLER LOCK

CROSS REFERENCE TO RELATED APPLICATIONS

This patent application claims priority to provisional patent application 63/584,232 titled Pick Resistant Pin Tumbler Lock and filed on Sep. 21, 2023. The subject matter of provisional patent application 63/584,232 is hereby incorporated by reference in its entirety.

STATEMENT REGARDING FEDERALLY SPONSORED RESEARCH DEVELOPMENT

Not applicable.

INCORPORATION BY REFERENCE OF MATERIAL SUBMITTED ON A COMPACT DISC

Not applicable.

TECHNICAL FIELD

The technical field relates generally to locking mechanisms and, more specifically, to pin tumbler locks designed to enhance resistance against unauthorized access, particularly through lock picking techniques.

BACKGROUND

Locking mechanisms have been an integral part of human civilization for centuries, serving the fundamental purpose of securing belongings and restricting unauthorized access to designated areas. Among the various types of locks that have been developed, pin tumbler locks have gained widespread acceptance and usage due to their relative simplicity, durability, and cost-effectiveness A conventional pin tumbler lock comprises a series of pin stacks, each containing a key pin and a driver pin, which are held in place by springs. When the correct key is inserted into the lock, the key pins and driver pins align perfectly at the shear line, allowing the plug to rotate and the lock to open. While this design has proven effective for general security applications, it is not without its shortcomings.

One of the most significant drawbacks of traditional pin tumbler locks is their vulnerability to lock picking. Various techniques, such as single-pin picking, raking, and bumping, have been developed to exploit the mechanical principles of these locks. Skilled individuals can manipulate the pin stacks to align at the shear line without the use of a key, thereby compromising the security of the lock. This susceptibility has been a long-standing issue and poses a considerable risk, especially in environments requiring high levels of security.

Moreover, the increasing availability of lock picking tools and instructional materials has made it easier for individuals with malicious intent to gain unauthorized access. In fact, in the U.S. alone, picked pin tumbler locks are known to be one of the main methods of entry for thieves and other criminals engaged in stealing. The pervasive issue of lock picking poses a significant threat to commerce in the United States, undermining the integrity of retail and business operations by making them susceptible to theft and unauthorized access. This not only results in substantial financial losses for businesses but also erodes consumer trust, thereby hampering economic growth and stability.

Therefore, there is a pressing need for innovative solutions that protect against lock picking. This new design should not only effectively mitigate these security vulnerabilities but also do so in a manner that retains the beneficial attributes and advantages inherent to the traditional pin tumbler locking mechanisms.

SUMMARY

An improved pin tumbler lock that is resistant to lock picking is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

A pin tumbler lock that is resistant to lock picking includes a shell, a gate located within the shell, the gate comprising a cylindrical case and a first plurality of bores, a core rotatably disposed within the gate and defining a keyway and a second plurality of bores that communicate with the keyway through the core and that, in the locked position, communicate with corresponding bores of the first plurality of bores in the gate to define a plurality of pin chambers. a plurality of magnetically activated key pins that are moveable within the pin chambers against magnetic activation by a key inserted in the keyway through a keyhole into a position wherein the core can be rotated relative to the gate, wherein each key pin comprises a body and a top element with a diameter larger than a diameter of the body, and wherein each key pin has a height randomly selected from a bitting range; and, the gate further comprising a plurality of channels corresponding to the plurality of pin chambers, wherein when the key is inserted into the keyway and the core rotates relative to the gate, the top element of each key pin moves within a respective one of the plurality of channels.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
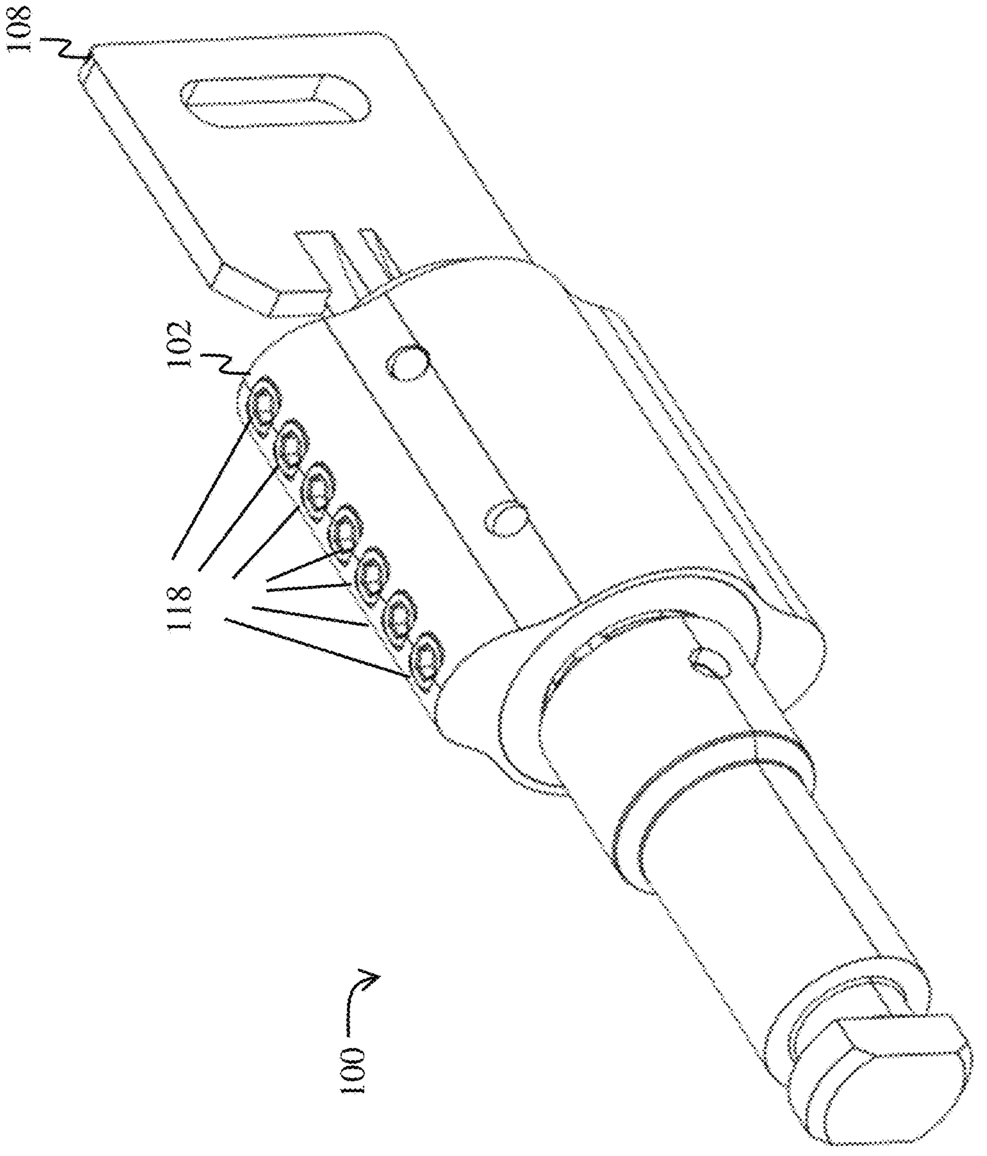
FIG. 1 is a top perspective view of the pin tumbler lock, according to an example embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a pin tumbler lock that exhibits all of the advantages of conventional pin tumbler locks but also provides resistance against lock picking techniques. The claimed embodiments provide an improved pin tumbler lock that significantly reduces the risk of lock picking, thereby enhancing the overall security and reliability of the locking mechanism The claimed subject matter provides a leap forward in security measures, instilling greater confidence among both consumers and businesses. By effectively thwarting unauthorized access, the claimed subject matter significantly reduces the risk of theft and break-ins, thereby contributing to a safer and more secure environment. Moreover, the claimed subject matter has a positive ripple effect on commerce, as businesses could operate with reduced insurance costs and increased peace of mind, while consumers would feel more secure in their transactions and property ownership.

The pin tumbler lock that is resistant to lock picking will now be described with reference to FIGS. 1-20.

The claimed embodiments disclose a pin tumbler lock apparatus 100 designed to be resistant to lock picking, thus enhancing security. The apparatus is primarily composed of several key components, each serving a unique function to improve the lock's resistance to tampering. The first major component is the shell 102, typically made of a robust material like hardened steel or a similar metal alloy for added durability and resistance to physical attacks. The shell serves as the outer casing that houses the other components of the lock 100. Inside the shell 102, a core 104 is rotatably disposed. The core is generally made from a strong material such as brass or stainless steel. The core 104 defines a keyway 106, which is a channel where a key 108 is inserted. The core has multiple bores 110 that communicate with the keyway. Located between the shell and the core is the gate 150, comprising a cylindrical case and a plurality of bores 112 that also communicate with the keyway. The multiple bores 110 of the core align with corresponding bores 112 in the gate 150, forming a series of pin chambers 114. I.e., each pin chamber 114 comprises a combination of a bore 110 in the core and a bore 112 in the gate 150.

Within the pin chambers 114 are magnetically activated key pins 120, usually made from materials like nickel-silver or brass for durability and smooth operation. At the top of each pin chamber there may be a set screw 118. The set screws 118 are used to stop key pins from moving too far away from their original position when they are manipulated by external forces. The key pins 120 are unique in that their heights are randomly selected from a bitting range, making the lock more secure by increasing the number of possible key combinations. Additionally, each key pin has a top element 125 with a diameter or width larger than the remaining sections. This unique design adds an extra layer of complexity, making it more difficult for lock pickers to manipulate the pins successfully.

One of the innovative features of the claimed embodiments is the inclusion of a gate 150 situated between the core 104 and the shell 102. The gate 150 comprises a cylindrical case that surrounds at least a portion of the core. The cylindrical case is equipped with multiple channels 152 that correspond to the pin chambers 114. When a key 108 is inserted into the keyway 106 and the core rotates relative to the shell, the top elements 125 of the key pins 120 move within these channels 152. This adds an additional layer of security, making it harder for unauthorized individuals to pick the lock. The gate can be formed from one integral piece of material, such as brass or stainless steel, or alternatively may be formed from multiple separate cylindrical elements of different diameters that are nested within one another.

FIG. 1 is a top perspective view of the pin tumbler lock 100, according to an example embodiment. FIG. 1 shows the set screws 118 in the shell 102, as well as the key 108.

Figure 2:
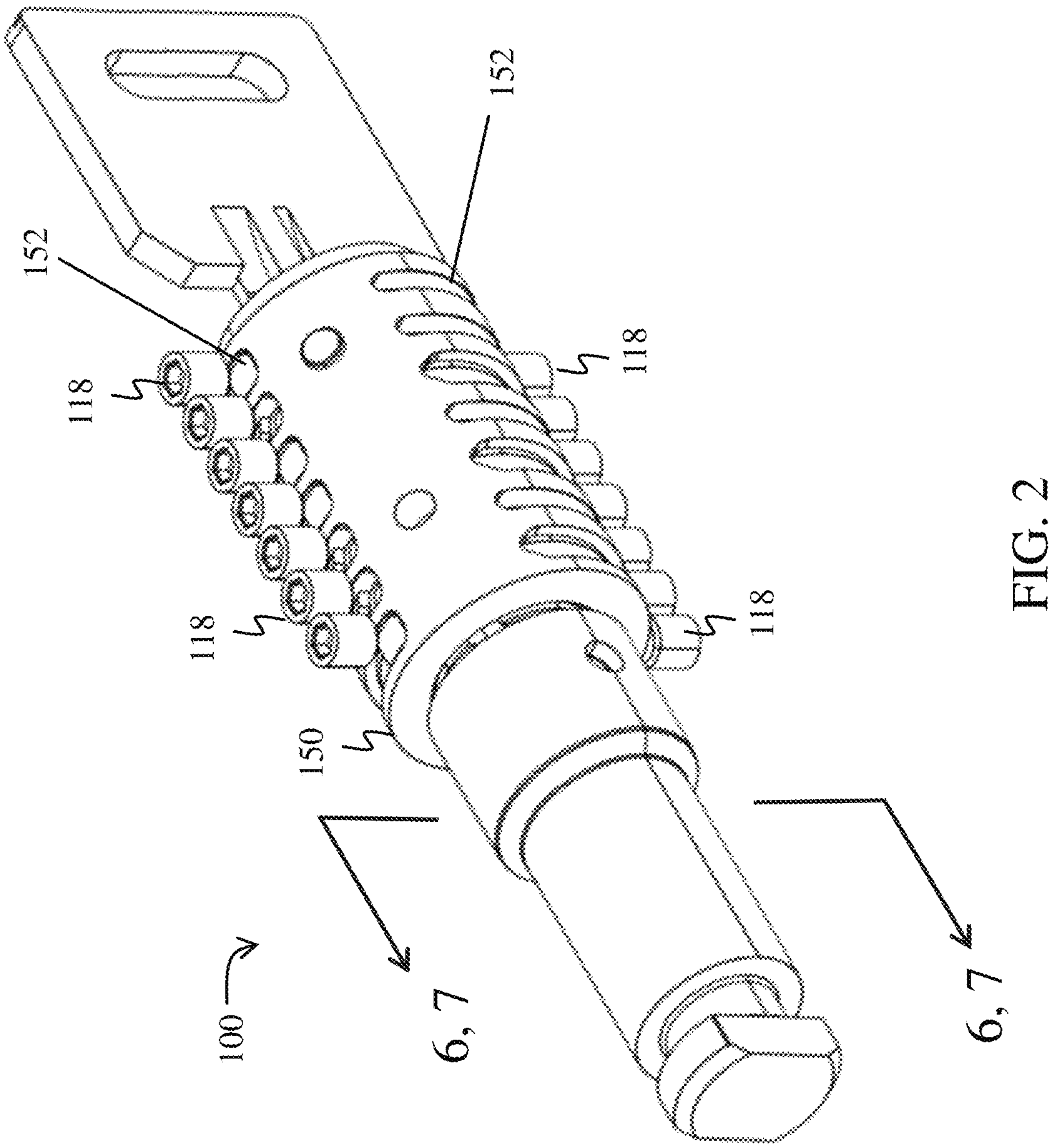
FIG. 2 is a top perspective view of the pin tumbler lock with the shell removed, according to an example embodiment.

FIG. 2 is a top perspective view of the pin tumbler lock 100 with the shell 102 removed, so as to show the gate 150, according to an example embodiment. FIG. 2 shows the gate 150, as well as the set screws 118 located within the shell.

Figure 3:
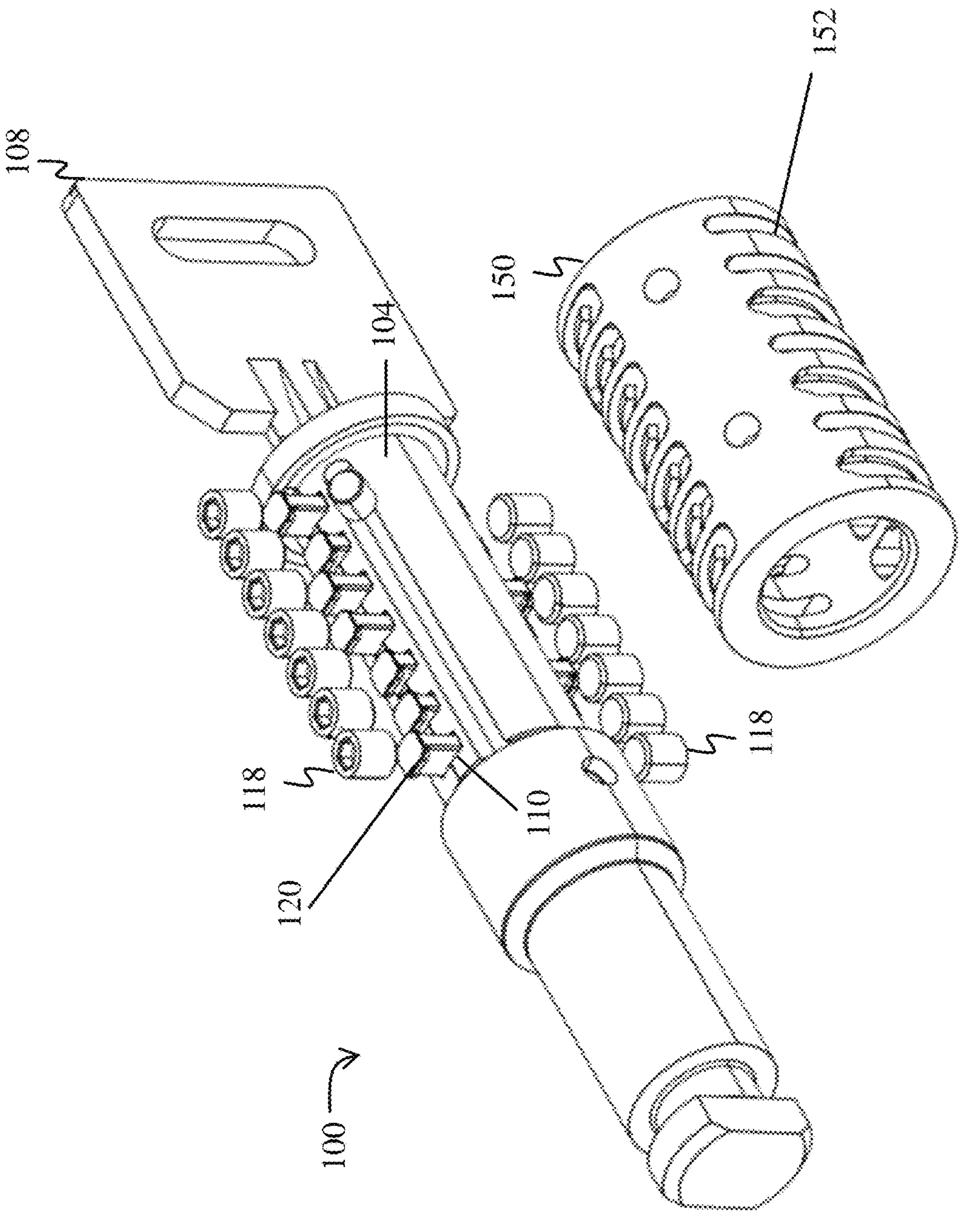
FIG. 3 is a top perspective view of the pin tumbler lock with the shell removed and gate disassembled, according to an example embodiment.

FIG. 3 is a top perspective view of the pin tumbler lock 100 with the shell 102 removed and the gate 150 disassembled, so as to show key pins 120 within the bores 110 of the core 104, according to an example embodiment. FIG. 3 shows the channels 152 in the gate 150. Each channel is explained in greater detail below.

Figure 4:
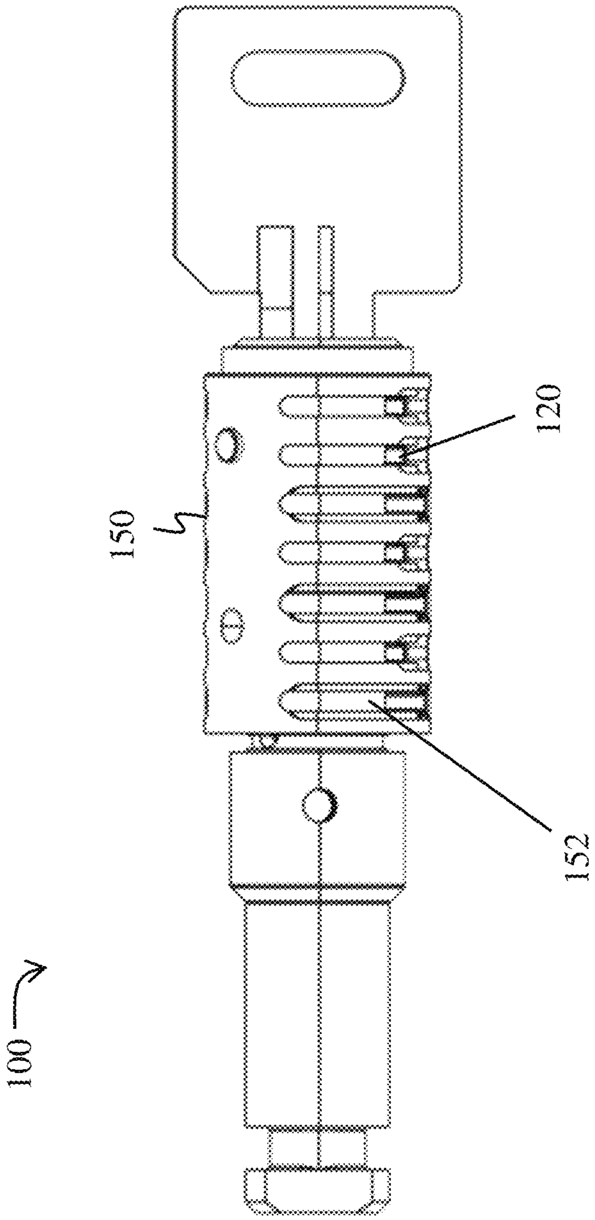
FIG. 4 is a side view of the pin tumbler lock, according to an example embodiment.

FIG. 4 is a side view of the pin tumbler lock 100 with the shell 102 removed, according to an example embodiment. FIG. 4 shows the gate 150 and the key pins 120 in the channels 152 when the key 108 has been placed in the keyway.

Figure 5:
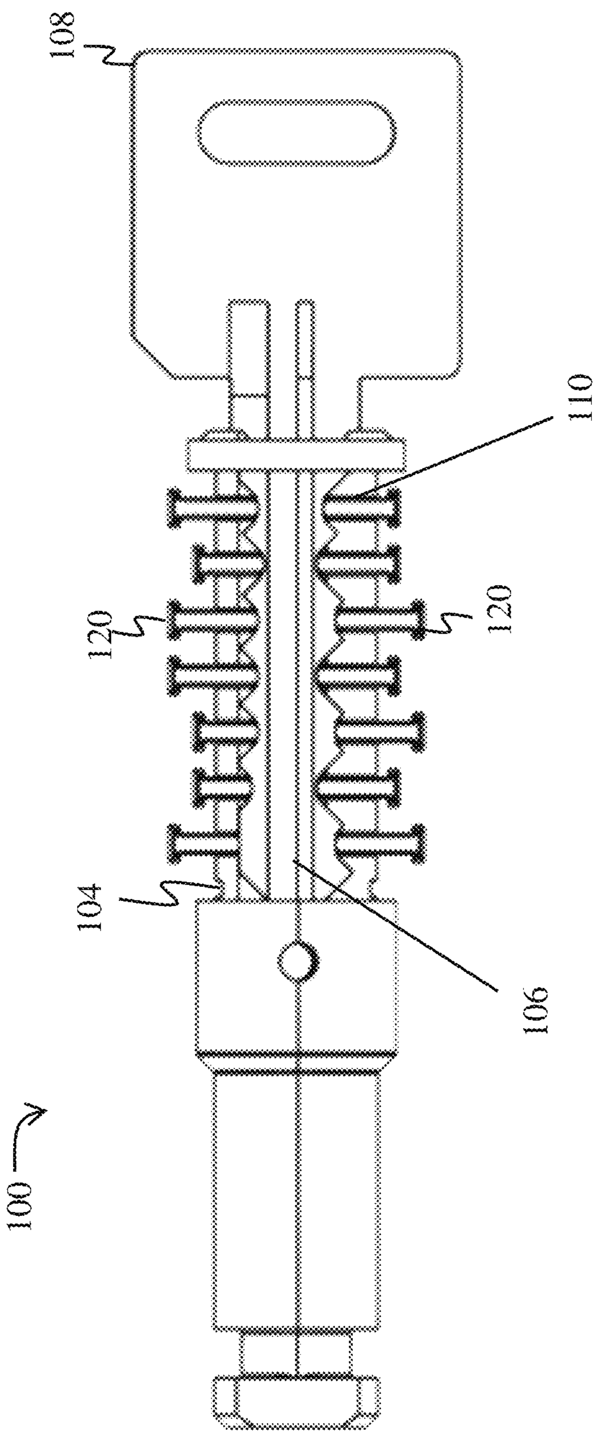
FIG. 5 is a side view of the pin tumbler lock with the shell and gate removed, according to an example embodiment.

FIG. 5 is a side view of the pin tumbler lock 100 with the shell 102 and gate 150 removed, according to an example embodiment. FIG. 5 shows how the key pins 120 have moved in the bores 110 of the core 104, when the key 108 has been placed in the keyway 106. FIG. 5 shows an embodiment where the key 108 may be shaped to move key pins along a top 602 and a bottom 604 of the lock 100. In this embodiment, there is a set of key pins in pin chambers along a top of the lock and a set of key pins in pin chambers along a bottom of the lock.

Figure 6:
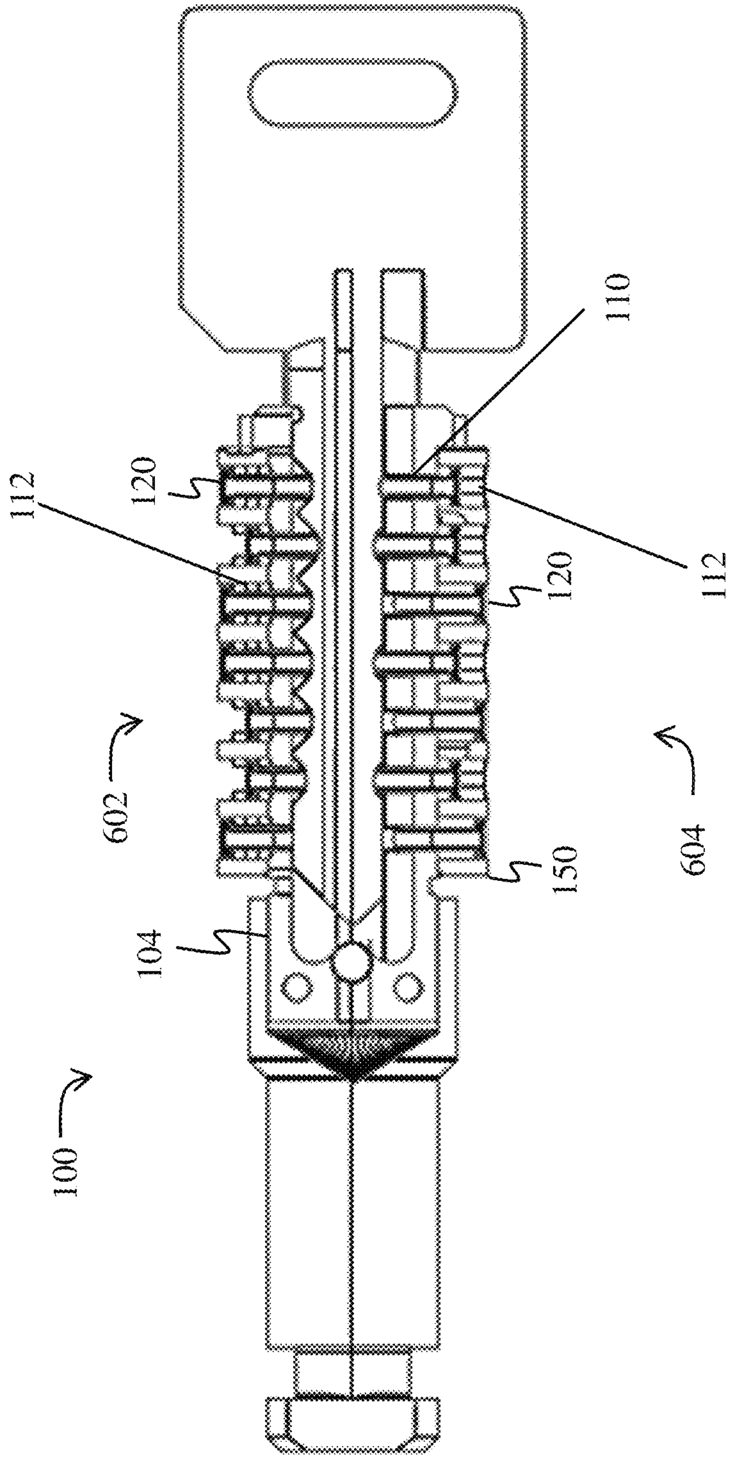
FIG. 6 is a side cross sectional view of the pin tumbler lock, according to an example embodiment.

FIG. 6 is a side cross-sectional view of the pin tumbler lock 100, according to an example embodiment. FIG. 6 shows the key pins 120 have moved in the bores 110 of the core 104, as well as the bores 112 of the gate 150, when the key 108 has been placed in the keyway 106. FIG. 6 also shows that the multiple bores 110 in the core 104 align with corresponding bores 112 in the gate 150. FIG. 6 shows how the key pins 120 have moved in the bores 110 of the core 104, and in the bores 112 of the gate 150, when the key 108 has been placed in the keyway 106.

FIG. 6 shows a first plurality of pin chambers along a top 602 of the lock and a second plurality of pin chambers along a bottom 604 of the lock. Thus, the key 108 is configured to interface with both the first and second plurality of pin chambers when inserted into the keyway 106. The lock contains a plurality of pin chambers, each comprising a key pin 120. The key pins are moveable within the bores against a magnetic force that pulls the key pins inward towards the magnets, i.e., towards the center of the core (see FIG. 20). When a key is inserted into the keyway, the key counteracts the magnetic force and pushes the key pins outwards and away from the keyway.

Figure 7:
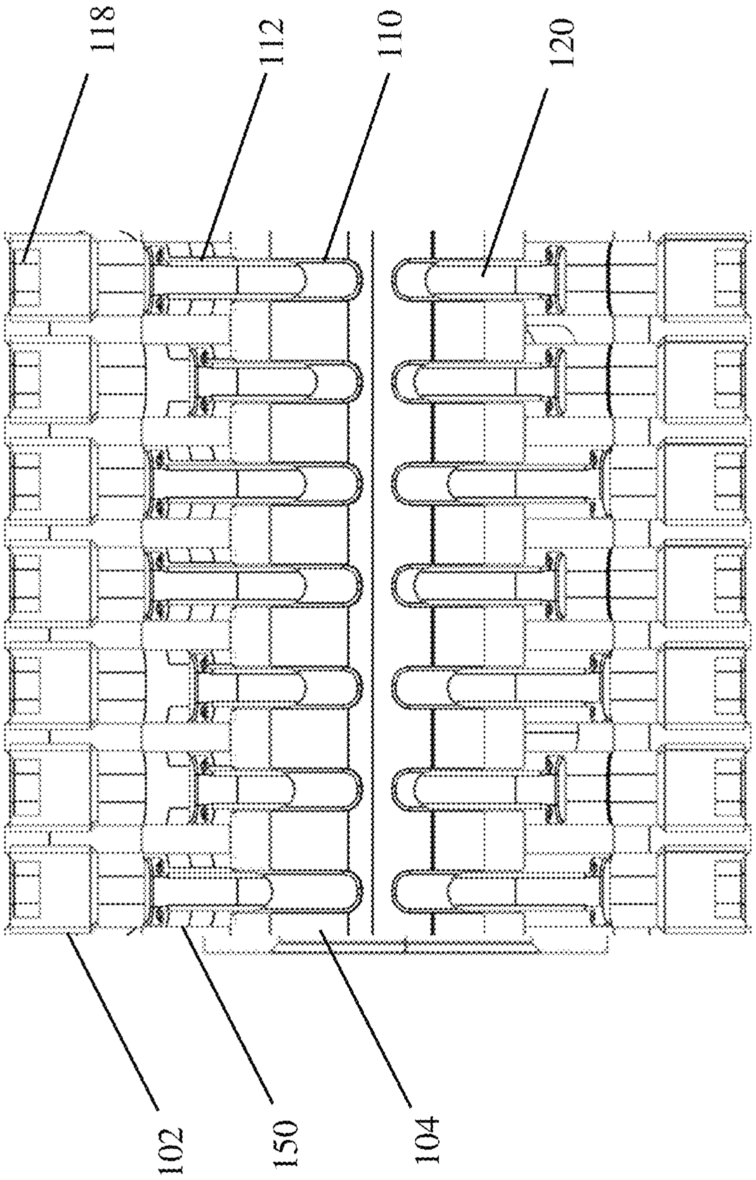
FIG. 7 is a side cross sectional view of the pin tumbler lock, according to an example embodiment.

FIG. 7 is a side cross sectional view of the pin tumbler lock 100, according to an example embodiment. FIG. 7 shows the plurality of bores 110 in the core 104, each of which aligns with respective ones of the bores 112 in the gate 150, each of which aligns with a respective set screw 118 in the shell 102.

Figure 8:
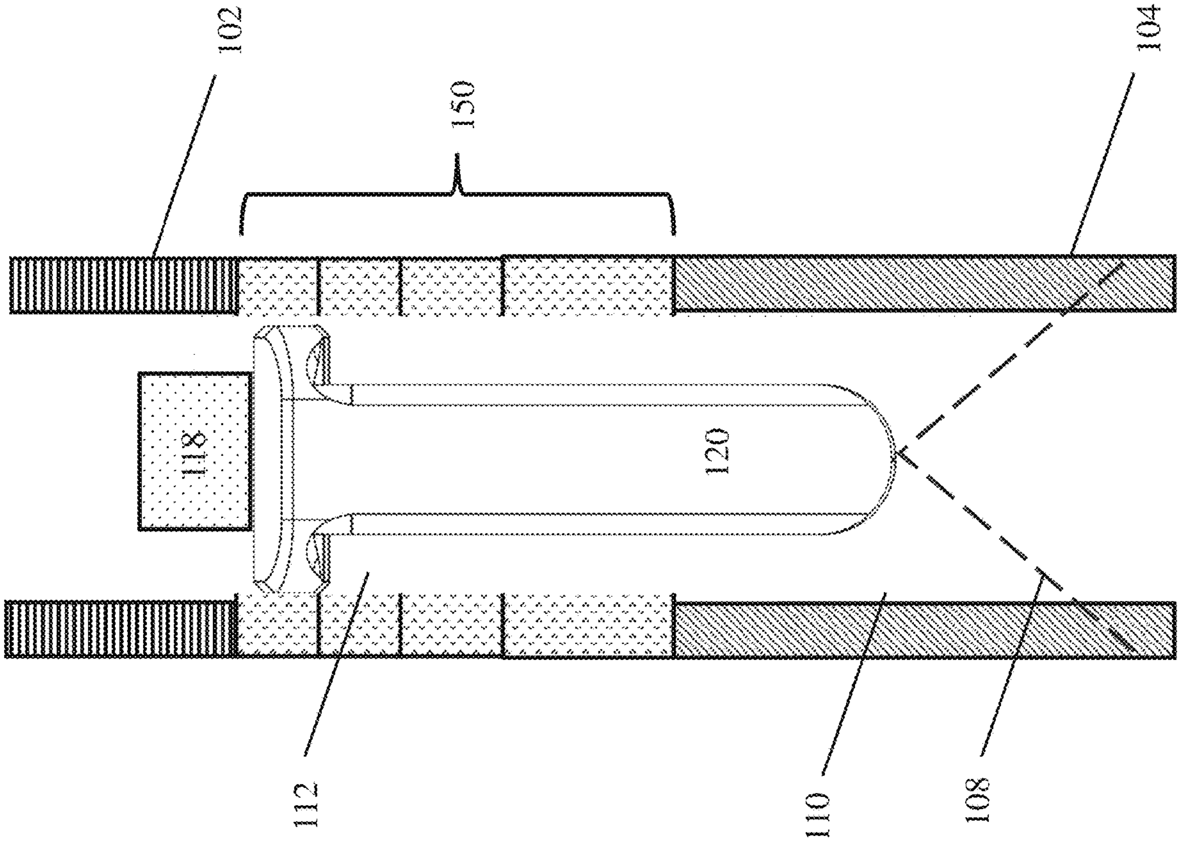
FIG. 8 is a side view of a key pin within a pin chamber in an unlocked position, according to an example embodiment.

FIG. 8 is a side view of a key pin 120 within a pin chamber 114 in an unlocked position, according to an example embodiment. The bore 110 of the core 104 aligns with a corresponding bore 112 in the gate, forming a pin chamber 114. Within the pin chamber 114 is a key pin 120. FIG. 8 shows that the key 108 has moved the key pin 120 to the top of the pin chamber, which is the correct level for the key pin to unlock the device 100. In said position, the key pin is able to travel along a channel of the plurality of channels when the core is rotated. In this position, the top of the key pin 120 reaches the stationary shell 102, at which the set screw 118 is located and which prevents the key pin from extending beyond the set screw.

Figure 9:
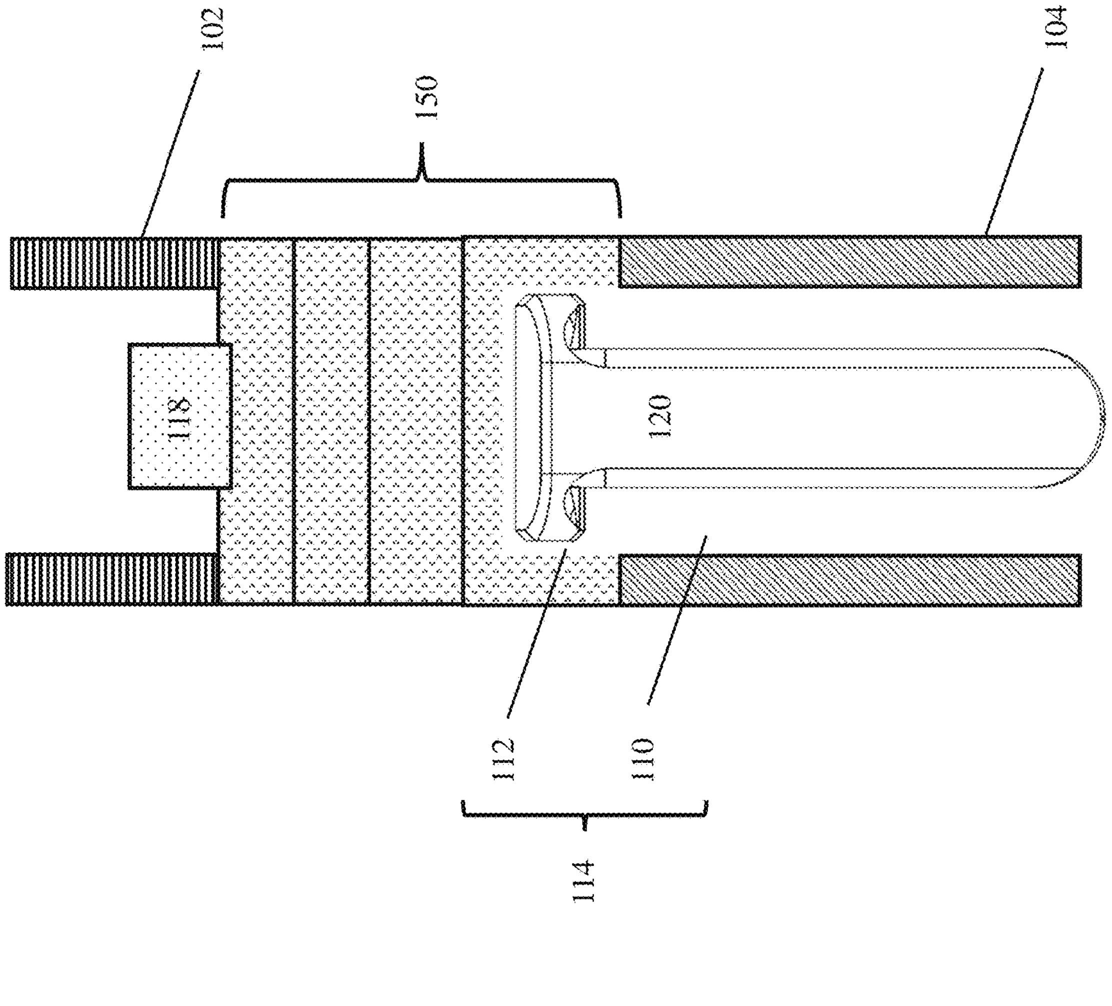
FIG. 9 is a side view of a key pin within a pin chamber in a locked position, according to an example embodiment.

FIG. 9 is a side view of a key pin 120 within a pin chamber 114 in a locked position, according to an example embodiment. In FIG. 8, the magnet has attracted the key pin 120 to the bottom of the pin chamber 114. In this position, the key pin 120 is not at the correct level for the key pin to unlock the device 100. In said position, the key pin is not able to travel along a channel of the plurality of channels when the core is rotated. Therefore, the device 100 is locked.

Figure 10:
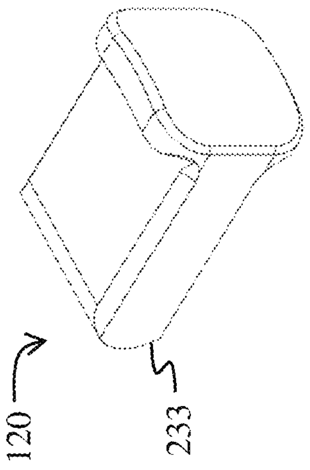
FIG. 10 is a top perspective view of a key pin, according to an example embodiment.
Figure 11:
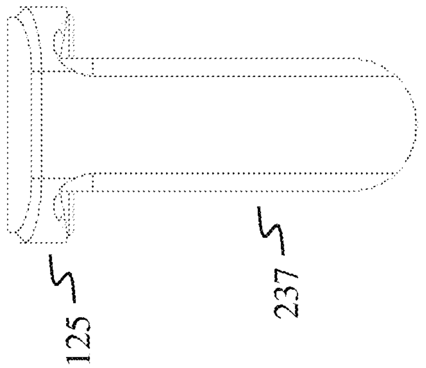
FIG. 11 is a front view of the key pin, according to an example embodiment.
Figure 12:
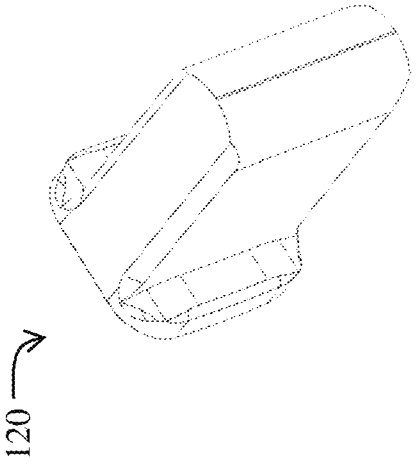
FIG. 12 is a bottom perspective view of the key pin, according to an example embodiment.
Figure 13:
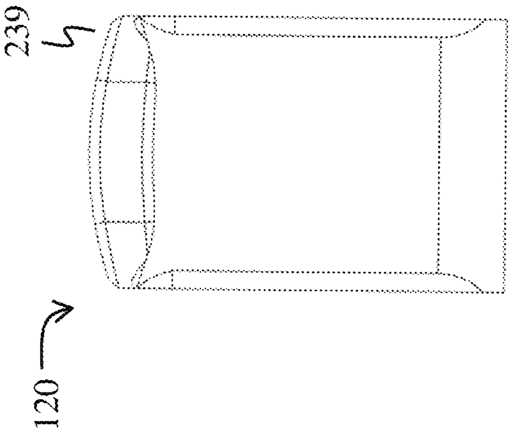
FIG. 13 is a side view of the key pin, according to an example embodiment.

FIG. 10 is a top perspective view of a key pin 120, according to an example embodiment. FIG. 11 is a front view of the key pin 120, according to an example embodiment. FIG. 12 is a bottom perspective view of the key pin 120, according to an example embodiment. FIG. 13 is a side view of the key pin 120, according to an example embodiment. FIGS. 10-13 show that the key pin 120 comprises a body 237 that is substantially cuboid shaped with a bottom element 233 that is rounded. The rounded feature facilitates the movement of the key 108 when it is inserted into the keyway 106. Upon insertion into the keyway (see FIG. 5), the key rakes against the bottom element of the key pins. A rounded bottom element allows for easier movement of said key, as opposed to jagged shapes that may catch against the key or cause friction.

FIGS. 10-13 also show that the key pin 120 comprises a top element 125 that is substantially cuboid shaped with a width (in one direction or axis) that is larger than the width of the body 237. FIG. 11 shows that when viewed from the front, the width of the top element 125 is larger than that of the body, although FIG. 13 shows that when viewed from the side, the width of the top element 125 is the same as that of the body.

FIGS. 10-13 also show that the top element 125 has a top surface 239 that is rounded. The rounded feature facilitates the movement of the key pin within the channels in the gate 150 when the core is rotated. Upon rotation of the core (see FIG. 7), the inner surface of the channels rake against the top element of the key pins. A rounded top element allows for easier movement of the key pins within the channels, as opposed to jagged shapes that may catch against the inner surface of the channels or cause friction.

FIGS. 10-13 show that the key pin 120 comprises a body 237 that is substantially cuboid shaped with a bottom element 233 that is rounded. The rounded feature facilitates the movement of the key 108 when it is inserted into the keyway 106. Upon insertion into the keyway (see FIG. 5), the key rakes against the bottom element of the key pins. A rounded bottom element allows for easier movement of said key, as opposed to jagged shapes that may catch against the key or cause friction.

Figure 15:
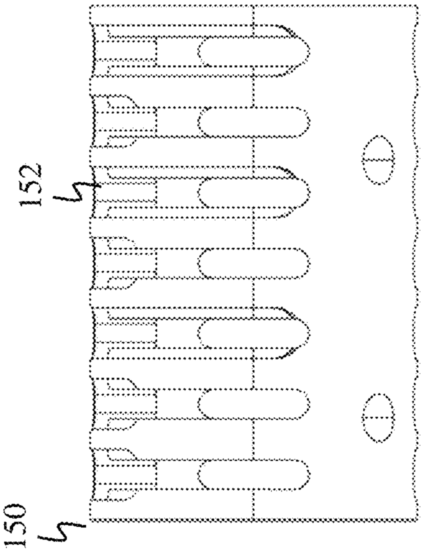
FIG. 15 is a left side view of the gate, according to an example embodiment.
Figure 17:
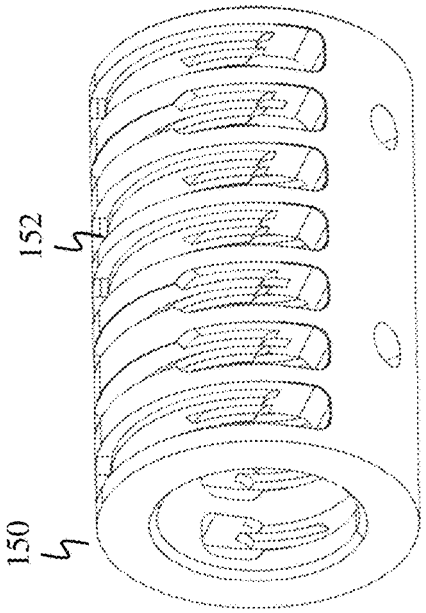
FIG. 17 is a top perspective view of the gate, according to an example embodiment.
Figure 14:
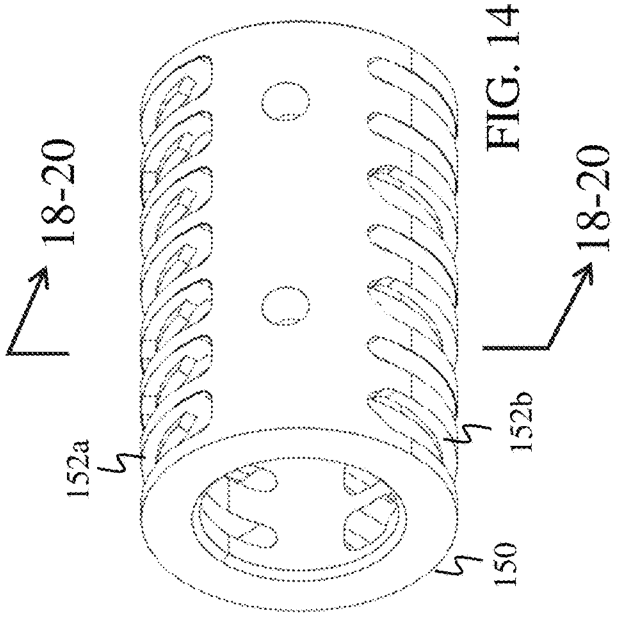
FIG. 14 is a side perspective view of a gate, according to an example embodiment.
Figure 16:
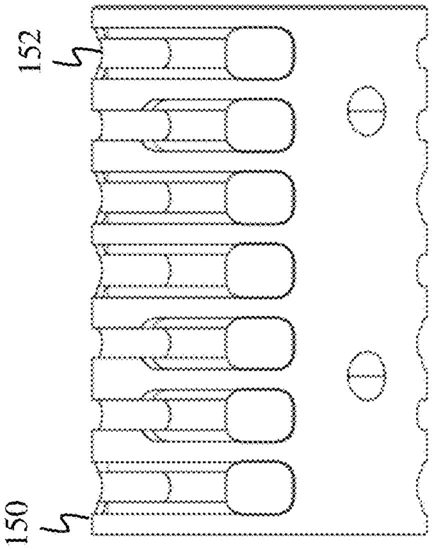
FIG. 16 is a right side view of the gate, according to an example embodiment.

FIG. 14 is a side perspective view of a gate 150, according to an example embodiment. FIG. 15 is a left side view of the gate 150, according to an example embodiment. FIG. 16 is a right side view of the gate 150, according to an example embodiment. FIG. 17 is a top perspective view of the gate 150, according to an example embodiment. FIGS. 14-17 show a first plurality of channels 152*a* along a top of the gate and a second plurality of channels 152*b* along a bottom of the gate, collectively referred to as the plurality of channels 152.

Figure 18:
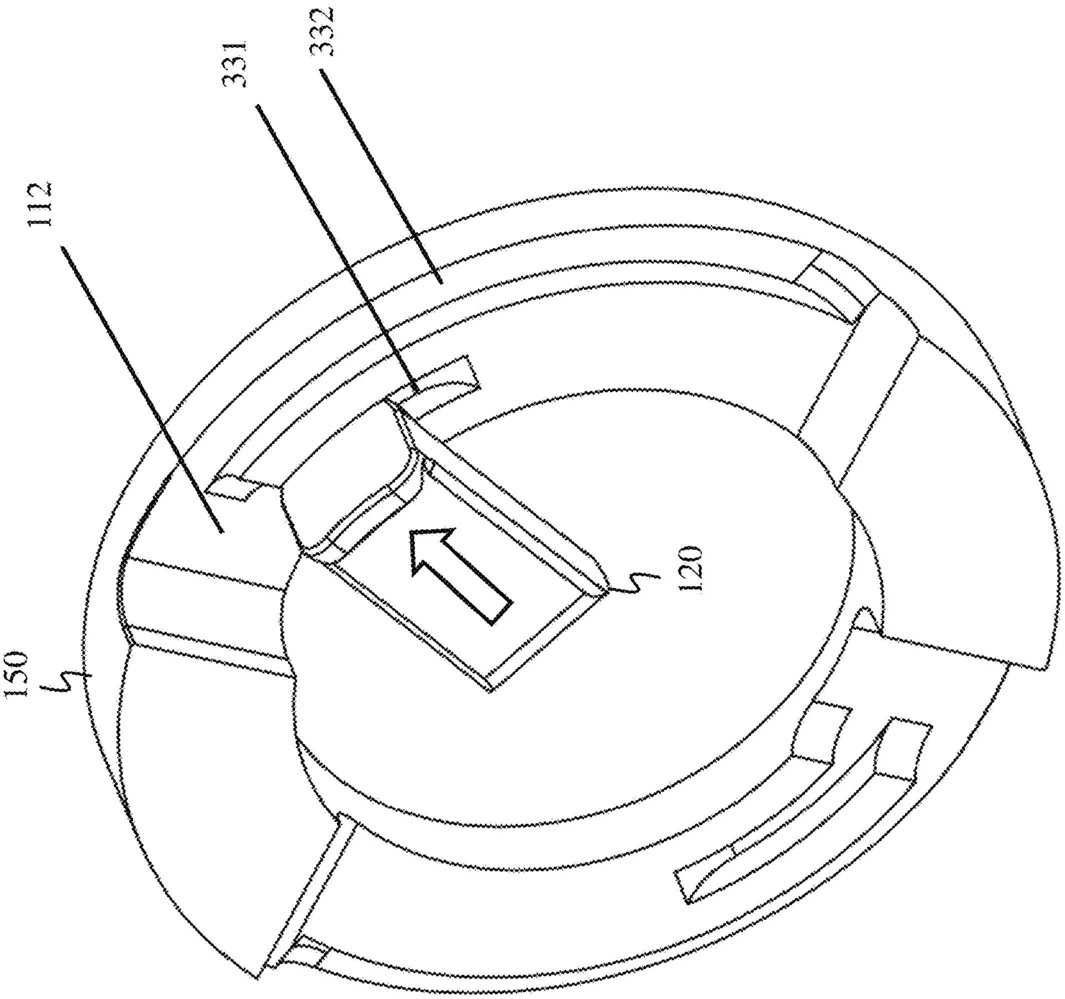
FIG. 18 is a side cross-sectional view of the gate, according to an example embodiment.

FIG. 18 is a side cross-sectional view of the gate 150, according to an example embodiment. FIG. 18 shows that each bore 112 (that corresponded to a key pine 120) provides access to at least two channels 331, 332 that extend along the interior volume of the solid gate 150. Each channel follows the curve of the walls of the cylinder of the gate 150. Note that channel 332 is located at a "height" or radial distance (from the center of the cylinder or circle in FIG. 18) that is greater than the "height" or radial distance of the channel 331. In FIG. 18, the correct channel that results in the unlocking of the lock for key pin 120 is the last channel 332. The remaining channel exists solely to confuse a lockpicker.

FIG. 18 shows that when the key pin 120 moves outward radially (see direction of arrow within key pin 120) within bore 112, the top element of the key pin reaches at least one of the channels-331 in FIG. 18. When the core is rotated, the top element of the key pin moves along said channel 331. In FIG. 18, channel 331 is the incorrect channel for the unlocking of the lock for key pin 120 as said channel only allow the core to turn a few degrees, as opposed to the required 90 degrees. The reason there are multiple channels (331, 332) at different heights or radial distances is to prevent lock picking techniques that rely on the movement of the key pin upon rotation to divulge the proper height of the key pin. Since the key pin 120 will move (at least a few degrees) during rotation at any of the channels 331, 332, the lockpicker cannot know which channel is the correct channel, and therefore cannot guess the proper height of the key pin.

Additionally, it should be noted that each of the plurality of key pins 120 (see FIG. 1) may have access to multiple channels corresponding to said key pins, as shown in FIG. 18. However, the height or radial distance of the correct channel for each key pin may be randomly assigned.

Figure 19:
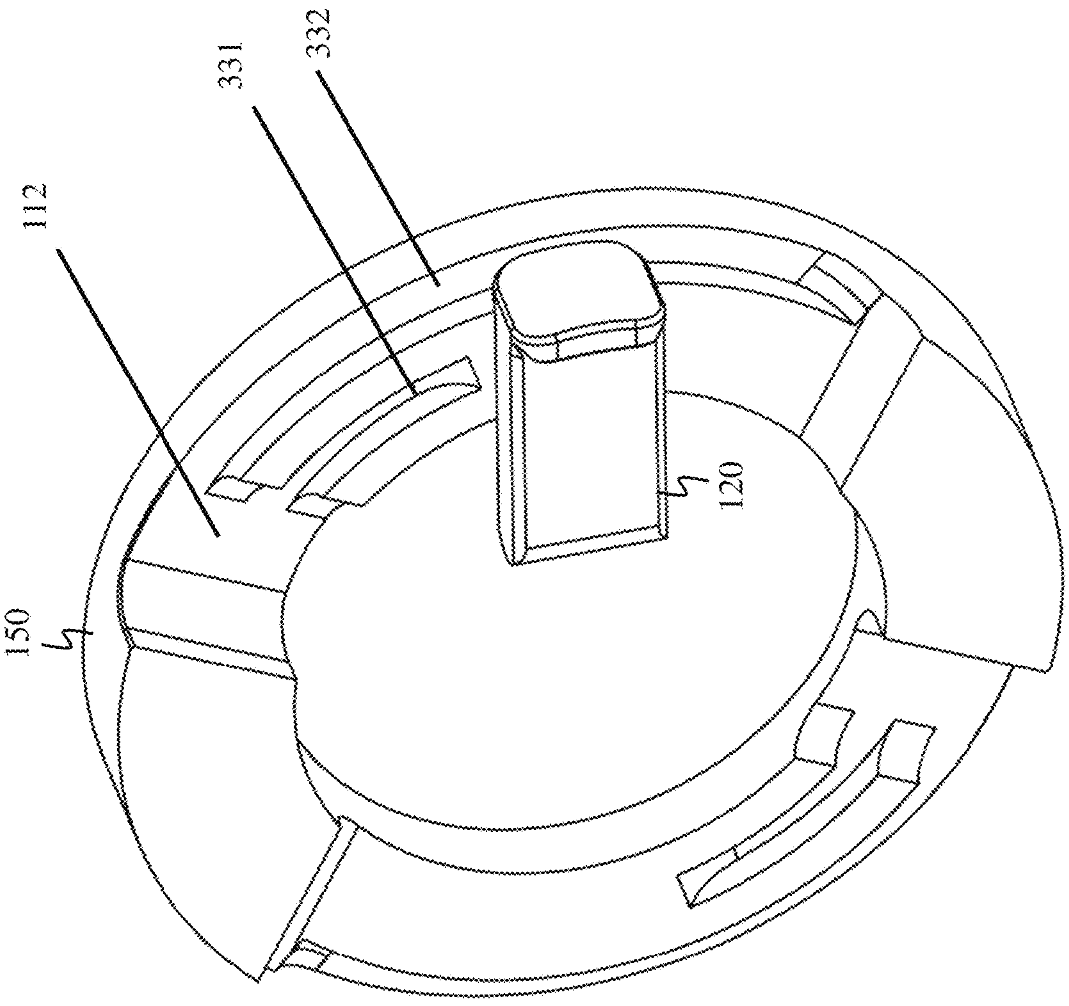
FIG. 19 is a side cross-sectional view of the gate, according to an example embodiment.

FIG. 19 is a side cross-sectional view of the gate 150, according to an example embodiment. FIG. 19 shows that when the key 108 is inserted into the keyway 106, the key pin 120 moves outward radially within bore 112 such that the top element of the key pin reaches the correct channel 332. When the key is turned within the core, the top element of the key pin moves along said channel 332 at least a full 90 degrees to unlock the lock. In FIG. 19, the correct channel that results in the unlocking of the lock for key pin 120 is the last channel 332. In sum, FIG. 19 shows that the channels are configured such that when a top element 125 of a key pin 120 passes through bore 112 and into channel 332, the key pin can move through the entire length of the channel 332, allowing the lock to open.

Figure 20:
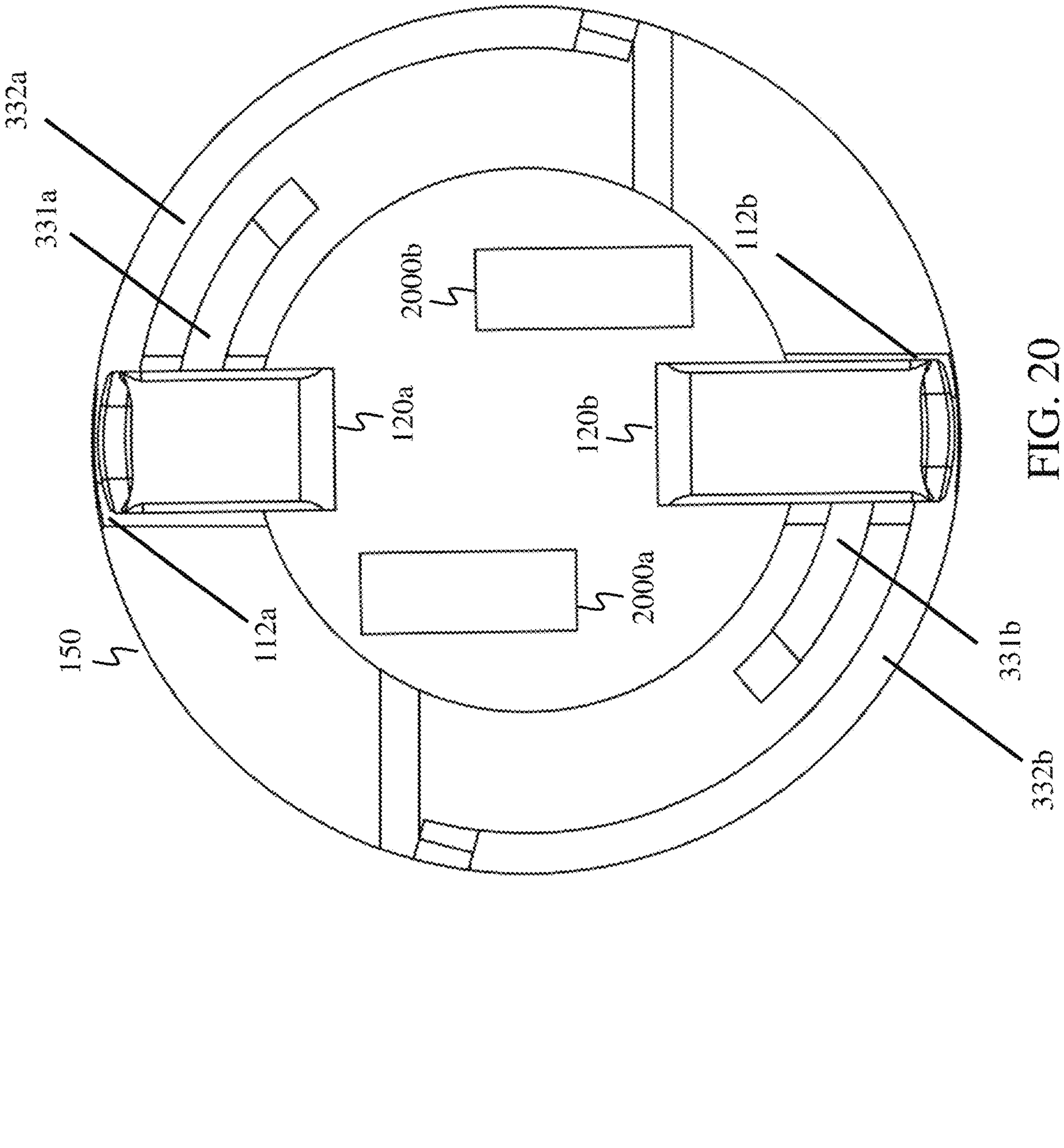
FIG. 20 is a front cross-sectional view of the gate, according to an example embodiment.

FIG. 20 is a front cross-sectional view of the gate 150, according to an example embodiment. FIG. 20 shows an embodiment wherein there exists a set of key pins along a top 602 of the device 100 and a set of key pins along a bottom 604 of the device 100. Consequently, there is a first plurality of pin chambers along a top 602 of the lock and a second plurality of pin chambers along a bottom 604 of the lock. FIG. 20 shows how magnetically activated key pin **120*a* is attracted to the magnet 2000*a* in the core 104 of the device 100. As the key 108 is inserted into the keyway 106, the key pin 120*a* is raised upwards through the bore 112*a*, in a direction opposite its magnetic attraction, such that the top element of the key pin 120*a* reaches the correct channel 332*a* for unlocking the device 100. FIG. 20 also shows how magnetically activated key pin 120*b* is attracted to the magnet 2000*b* in the core 104 of the device 100. As the key 108 is inserted into the keyway 106, the key pin 120*b* is lowered downwards through the bore 112*b*, in a direction opposite its magnetic attraction, such that the top element of the key pin 120*b* reaches the correct channel 332*b* for unlocking the device 100. At the juncture shown in FIG. 20, the device 100 is ready for unlocking. The location of the key pins 120*a*, 120*b* will allow the core to rotate at least 90 degrees to unlock the device 100**.

For enhanced security, the lock apparatus can feature seven or more pin chambers, having seven or more corresponding channels in the gate 150. In another embodiment, the lock apparatus can feature seven or more pin chambers along a top 602 of the device, having seven or more corresponding channels **152*a* along a top of the gate, as well as seven or more pin chambers along a bottom 604 of the device, having seven or more corresponding channels 152*b* along a bottom of the gate 150**. Remarkably, the gate can be formed from one integral piece of material, such as hardened steel, to provide added resistance against tampering. Alternatively, the gate may be formed from multiple separate cylindrical elements of different diameters that are nested within one another.

The advantages of this invention are numerous. The use of magnetic stacks adds a layer of complexity that makes the lock more resistant to picking. The multiple channels provide additional barriers that a would-be intruder must navigate, further enhancing security. The option for seven or more pin chambers allows for a high degree of customization, making each lock unique and even more difficult to compromise. Overall, this pin tumbler lock apparatus 100 offers a robust and highly secure locking solution.

The advantages of the claimed embodiments are numerous. The unique design of the key pins, along with the inclusion of the gate, significantly improves the lock's resistance to picking. The use of durable materials for the shell, core, and pins ensures long-lasting performance. Overall, the claimed pin tumbler lock apparatus provides a more secure and reliable locking mechanism, effectively addressing the vulnerabilities commonly associated with traditional pin tumbler locks.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A pin tumbler lock apparatus, comprising:

a) a shell;

b) a gate located within the shell, the gate comprising a cylindrical case and a first plurality of bores;

c) a core rotatably disposed within the gate and defining a keyway and a second plurality of bores that communicate with the keyway through the core and that, in the locked position, communicate with corresponding bores of the first plurality of bores in the gate to define a plurality of pin chambers;

d) a plurality of magnetically activated key pins that are moveable within the pin chambers against magnetic activation by a key inserted in the keyway through a keyhole into a position wherein the core can be rotated relative to the gate;

e) wherein each key pin comprises a body and a top element with a diameter larger than a diameter of the body, and wherein each key pin has a height randomly selected from a bitting range; and f) the gate further comprising a plurality of channels corresponding to the plurality of pin chambers, wherein when the key is inserted into the keyway and the core rotates relative to the gate, the top element of each key pin moves within a respective one of the plurality of channels.

2. The apparatus of claim 1, wherein each bore of the first plurality of bores provides access to at least two channels of the plurality of channels.

3. The apparatus of claim 2, wherein a first channel of the at least two channels is located at a radial height different from a radial height of second channel of the at least two channels.

4. The apparatus of claim 3, wherein the first channel of the at least two channels has a length different from a length of the second channel of the at least two channels.

5. The apparatus of claim 4, wherein each bore of the first plurality of bores has a width configured to accommodate the top element of each key pin.

6. The apparatus of claim 5, wherein the body of each key pin is substantially cuboidal.

7. The apparatus of claim 6, wherein the plurality of pin chambers comprises seven or more pin chambers.

8. The apparatus of claim 7, wherein the plurality of key pins comprises seven or more key pins.

9. The apparatus of claim 8, wherein each key pin of the plurality of key pins comprises a rounded bottom end.

10. The apparatus of claim 9, wherein the gate is formed from one integral piece of material.

11. A pin tumbler lock apparatus, comprising:

a) a shell;

b) a gate located within the shell, the gate comprising a cylindrical case, a first plurality of bores along its top and a second plurality of bores along its bottom;

c) a core rotatably disposed within the gate and defining a keyway, a third plurality of bores along a top of the core and a fourth plurality of bores along a bottom of the core, wherein the third and fourth plurality of bores communicate with the keyway through the core and that, in the locked position, communicate with corresponding bores of the first and second plurality of bores in the gate to define a plurality of pin chambers;

d) a plurality of magnetically activated key pins that are moveable within the pin chambers against magnetic activation by a key inserted in the keyway through a keyhole into a position wherein the core can be rotated relative to the gate;

e) wherein each key pin comprises a body and a top element with a diameter larger than a diameter of the body, and wherein each key pin has a height randomly selected from a bitting range; and f) the gate further comprising a plurality of channels corresponding to the plurality of pin chambers, wherein when the key is inserted into the keyway and the core rotates relative to the gate, the top element of each key pin moves within a respective one of the plurality of channels.

12. The apparatus of claim 11, wherein each bore of the first and second plurality of bores provides access to at least two channels of the plurality of channels.

13. The apparatus of claim 12, wherein a first channel of the at least two channels is located at a radial height different from a radial height of second channel of the at least two channels.

14. The apparatus of claim 13, wherein the first channel of the at least two channels has a length different from a length of the second channel of the at least two channels.

15. The apparatus of claim 14, wherein each bore of the first and second plurality of bores has a width configured to accommodate the top element of each key pin.

16. The apparatus of claim 15, wherein the body of each key pin is substantially cuboidal.

17. The apparatus of claim 16, wherein the plurality of pin chambers comprises fourteen or more pin chambers.

18. The apparatus of claim 17, wherein the plurality of key pins comprises fourteen or more key pins.

19. The apparatus of claim 18, wherein each key pin of the plurality of key pins comprises a rounded bottom end.

20. The apparatus of claim 19, wherein the gate is formed from one integral piece of material.

* * * * *